(12) United States Patent
Nandagopal et al.

(10) Patent No.: US 12,118,409 B2
(45) Date of Patent: Oct. 15, 2024

(54) METHODS FOR DYNAMIC THROTTLING TO SATISFY MINIMUM THROUGHPUT SERVICE LEVEL OBJECTIVES AND DEVICES THEREOF

(71) Applicant: NetApp, Inc., San Jose, CA (US)

(72) Inventors: Ranjit Nandagopal, Cary, NC (US); Yasutaka Hirasawa, Cary, NC (US); Chandan Hoode, Morrisville, NC (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/382,125

(22) Filed: Oct. 20, 2023

(65) Prior Publication Data
US 2024/0054023 A1    Feb. 15, 2024

Related U.S. Application Data

(63) Continuation of application No. 17/715,569, filed on Apr. 7, 2022, now Pat. No. 11,829,803, which is a continuation of application No. 16/519,429, filed on Jul. 23, 2019, now Pat. No. 11,314,558.

(51) Int. Cl.
*G06F 9/50* (2006.01)
*G06F 9/48* (2006.01)

(52) U.S. Cl.
CPC .......... *G06F 9/5083* (2013.01); *G06F 9/4881* (2013.01); *G06F 9/4887* (2013.01); *G06F 2209/5022* (2013.01)

(58) Field of Classification Search
None
See application file for complete search history.

(56) References Cited

U.S. PATENT DOCUMENTS

| 5,115,430 A | 5/1992 | Hahne et al. |
| 5,634,006 A | 5/1997 | Baugher et al. |
| 5,828,568 A | 10/1998 | Sunakawa et al. |

(Continued)

OTHER PUBLICATIONS

International Preliminary Report on Patentability and Written Opinion for PCT/US2020/042779, dated Feb. 3, 2022.

(Continued)

*Primary Examiner* — Adam Lee
(74) *Attorney, Agent, or Firm* — Troutman Pepper Hamilton Sanders LLP

(57) ABSTRACT

Methods, non-transitory machine readable media, and computing devices that dynamically throttle non-priority workloads to satisfy minimum throughput service level objectives (SLOs) are disclosed. With this technology, a determination is made when a number of detection intervals with a violation within a detection window exceeds a threshold, when a current one of the detection intervals is outside an observation area. The detection intervals are identified a violated based on an average throughput for priority workloads within the detection intervals exceeding a minimum throughput SLO. A throttle is then set to rate-limit non-priority workloads, when the number of violated detection intervals within the detection window exceeds the threshold. Advantageously, throughput for priority workloads is more effectively managed and utilized with this technology such that throttling oscillations are reduced, throttling is not deployed in conditions in which it would not improve throughput, and throttling is minimally deployed to maximize throughput.

20 Claims, 9 Drawing Sheets

(56) References Cited

U.S. PATENT DOCUMENTS

| | | | |
|---|---|---|---|
| 6,233,645 B1 | 5/2001 | Chrysos et al. | |
| 7,281,086 B1 | 10/2007 | More et al. | |
| 7,827,361 B1 | 11/2010 | Karlsson et al. | |
| 8,429,282 B1 | 4/2013 | Ahuja et al. | |
| 10,255,231 B1 | 4/2019 | Briggs et al. | |
| 11,314,558 B2 | 4/2022 | Nandagopal et al. | |
| 2002/0046264 A1 | 4/2002 | Dillon et al. | |
| 2003/0135632 A1 | 7/2003 | Vrzic et al. | |
| 2004/0218545 A1* | 11/2004 | Pedersen | H04L 47/29 370/230.1 |
| 2005/0050220 A1 | 3/2005 | Rouyer et al. | |
| 2005/0256945 A1* | 11/2005 | Martin | H04L 41/147 709/223 |
| 2007/0050650 A1 | 3/2007 | Conroy et al. | |
| 2007/0112723 A1* | 5/2007 | Alvarez | G06F 9/50 |
| 2007/0271570 A1* | 11/2007 | Brown | G06F 9/5033 707/E17.007 |
| 2009/0113439 A1 | 4/2009 | Zettler et al. | |
| 2009/0282406 A1 | 11/2009 | Malki et al. | |
| 2010/0008308 A1 | 1/2010 | Su et al. | |
| 2011/0145795 A1* | 6/2011 | Khanapurkar | G06F 11/3466 717/126 |
| 2012/0005683 A1 | 1/2012 | Bower, III et al. | |
| 2012/0320924 A1 | 12/2012 | Baliga et al. | |
| 2013/0086302 A1 | 4/2013 | Tressler et al. | |
| 2013/0312005 A1* | 11/2013 | Chiu | G06F 3/0685 718/105 |
| 2014/0056132 A1 | 2/2014 | Lim et al. | |
| 2014/0059558 A1 | 2/2014 | Davis et al. | |
| 2014/0108996 A1 | 4/2014 | Maekawa et al. | |
| 2014/0189709 A1 | 7/2014 | Fernando et al. | |
| 2014/0195699 A1 | 7/2014 | Sokol, Jr. et al. | |
| 2014/0237468 A1 | 8/2014 | Desai et al. | |
| 2014/0281202 A1* | 9/2014 | Hunter | G06F 13/1636 711/106 |
| 2015/0006710 A1 | 1/2015 | Sauerwald et al. | |
| 2015/0205635 A1 | 7/2015 | Wang | |
| 2015/0346800 A1 | 12/2015 | Kumar | |
| 2015/0346809 A1 | 12/2015 | Kumar | |
| 2015/0347186 A1 | 12/2015 | Truong et al. | |
| 2015/0355943 A1 | 12/2015 | Harris et al. | |
| 2016/0054780 A1 | 2/2016 | Bodas et al. | |
| 2016/0335115 A1 | 11/2016 | Sykes et al. | |
| 2016/0364267 A1 | 12/2016 | Varadarajan et al. | |
| 2017/0228260 A1 | 8/2017 | Krishan et al. | |
| 2017/0249191 A1 | 8/2017 | Chang et al. | |
| 2017/0366467 A1 | 12/2017 | Martin et al. | |
| 2018/0129534 A1 | 5/2018 | Iyigun et al. | |
| 2018/0314547 A1 | 11/2018 | Bak et al. | |
| 2018/0373568 A1 | 12/2018 | Frost | |
| 2019/0036808 A1 | 1/2019 | Shenoy et al. | |
| 2019/0057484 A1 | 2/2019 | Iwamoto et al. | |
| 2019/0095633 A1 | 3/2019 | Bufferne et al. | |
| 2019/0149475 A1 | 5/2019 | Martin | |
| 2019/0190805 A1 | 6/2019 | Hunt et al. | |
| 2019/0340155 A1 | 11/2019 | Brewer | |
| 2020/0117504 A1 | 4/2020 | Bahl et al. | |
| 2022/0229706 A1 | 7/2022 | Nandagopal et al. | |

OTHER PUBLICATIONS

International Search Report and Written Opinion for Application No. PCT/US2020/042779, mailed on Oct. 14, 2020, 9 pages.

Notice of Allowance mailed on Aug. 4, 2023 for U.S. Appl. No. 17/715,569, filed Apr. 7, 2022, 18 pages.

* cited by examiner

METHODS FOR DYNAMIC THROTTLING TO SATISFY MINIMUM THROUGHPUT SERVICE LEVEL OBJECTIVES AND DEVICES THEREOF

This application is a continuation of U.S. patent application Ser. No. 17/715,569, filed Apr. 7, 2022, which is a continuation of U.S. patent application Ser. No. 16/519,429, filed Jul. 23, 2019, each of which is hereby incorporated by reference in its entirety.

FIELD

This technology generally relates to data storage networks and devices and, more particularly, to methods and devices for improving device performance via dynamic throttling to satisfy minimum throughput service level objectives (SLOs) for priority data storage workloads.

BACKGROUND

Data storage networks are increasingly utilized to store large volumes of data on behalf of enterprise and other types of users. Storage controllers or filers host storage operating systems that facilitate the exchange of data between applications and back-end storage devices. In many deployments, certain workloads handled by the storage operating systems require higher priority treatment or quality of service (QoS) that is specified in service level objectives (SLOs) or service level agreements (SLAs). The higher priority workloads can be associated with particular applications or certain types of storage operations or stored data, for example.

One particular type of SLO can specify a guaranteed minimum throughput for certain types of high priority workloads. In an exemplary implementation, a storage operating system can assign a deadline to requests associated with the high priority workloads, and utilize a deadline-aware scheduling for the requests to meet the guaranteed minimum throughput SLO. However, resource utilization often exceeds an optimal level, resulting in increased latency, reduced throughput, and a failure to satisfy the guaranteed minimum throughput SLO.

When a guaranteed minimum throughput SLO is violated, storage operating systems can throttle interfering, lower priority or non-guaranteed throughput requests. However, current throttling mechanisms are ineffective and insufficient. For example, current throttling techniques yield significant oscillations resulting in too much or too little throttling and sub-optimal throughput. Additionally, storage operating systems are currently unable to determine when a throttle will not be effective to meet the guaranteed minimum throughput SLO, and should not therefore be utilized.

DETAILED DESCRIPTION

Figure 1:
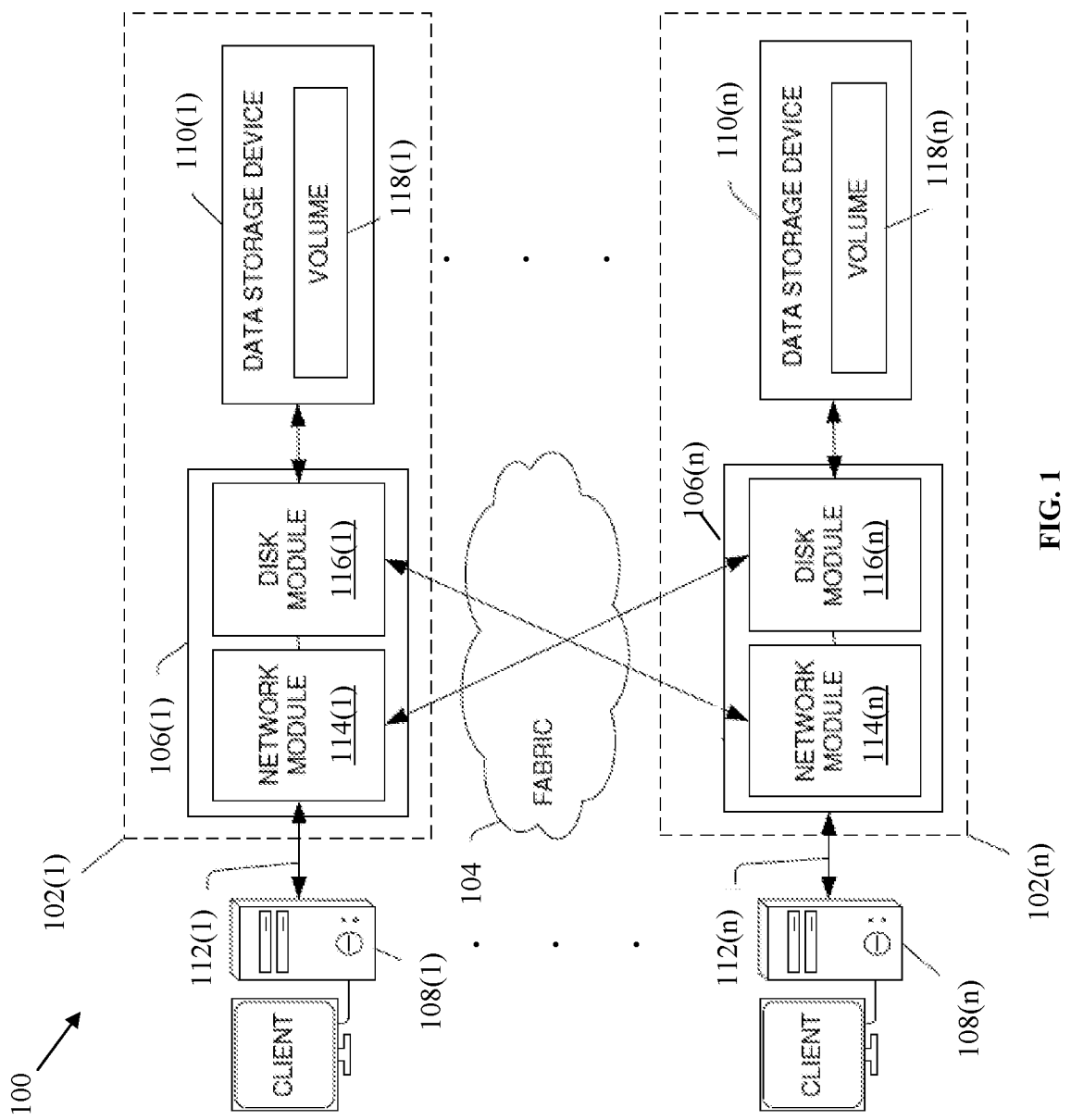
FIG. 1 is a block diagram of a network environment with exemplary node computing devices.

A clustered network environment 100 that may implement one or more aspects of the technology described and illustrated herein is shown in FIG. 1. The clustered network environment 100 includes data storage apparatuses 102(1)-102(n) that are coupled over a cluster or data fabric 104 that includes one or more communication network(s) and facilitates communication between the data storage apparatuses 102(1)-102(n) (and one or more modules, components, etc. therein, such as, node computing devices 106(1)-106(n), for example), although any number of other elements or components can also be included in the clustered network environment 100 in other examples. This technology provides a number of advantages including methods, non-transitory computer readable media, and computing devices that improve performance via dynamic throttling to satisfy guaranteed minimum throughput service level objectives (SLOs) for priority data storage workloads.

In this example, node computing devices 106(1)-106(n) can be primary or local storage controllers or secondary or remote storage controllers that provide client devices 108(1)-108(n) with access to data stored within data storage devices 110(1)-110(n). The data storage apparatuses 102(1)-102(n) and/or node computing devices 106(1)-106(n) of the examples described and illustrated herein are not limited to any particular geographic areas and can be clustered locally and/or remotely. Thus, in one example the data storage apparatuses 102(1)-102(n) and/or node computing device 106(1)-106(n) can be distributed over a plurality of storage systems located in a plurality of geographic locations; while in another example a clustered network can include data storage apparatuses 102(1)-102(n) and/or node computing device 106(1)-106(n) residing in a same geographic location (e.g., in a single on-site rack).

In the illustrated example, one or more of the client devices 108(1)-108(n), which may be, for example, personal computers (PCs), computing devices used for storage (e.g., storage servers), or other computers or peripheral devices, are coupled to the respective data storage apparatuses 102(1)-102(n) by network connections 112(1)-112(n). Network connections 112(1)-112(n) may include a local area network (LAN) or wide area network (WAN), for example, that utilize Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 108(1)-108(n) may be general-purpose computers running applications and may interact with the data storage apparatuses 102(1)-102(n) using a client/server model for exchange of information. That is, the client devices 108(1)-108(n) may request data from the data storage apparatuses 102(1)-102(n) (e.g., data on one of the data storage devices 110(1)-110(n) managed by a network storage controller configured to process I/O commands issued by the client devices 108(1)-108(n)), and the data storage apparatuses 102(1)-102(n) may return results of the request to the client devices 108(1)-108(n) via the network connections 112(1)-112(n).

The node computing devices 106(1)-106(n) of the data storage apparatuses 102(1)-102(n) can include network or host nodes that are interconnected as a cluster to provide data storage and management services, such as to an enterprise having remote locations, cloud storage, etc., for example. Such node computing devices 106(1)-106(n) can be attached to the fabric 104 at a connection point, redistribution point, or communication endpoint, for example. One or more of the node computing devices 106(1)-106(n) may be capable of sending, receiving, and/or forwarding information over a network communications channel, and could comprise any type of device that meets any or all of these criteria.

In an example, the node computing devices 106(1) and 106(n) may be configured according to a disaster recovery configuration whereby a surviving takeover node provides switchover access to the storage devices 110(1)-110(n) in the event a failure or planned takeover event occurs (e.g., the node computing device 106(1) provides client device 112(n) with switchover data access to storage devices 110(n)). Additionally, while two node computing devices are illustrated in FIG. 1, any number of node computing devices or data storage apparatuses can be included in other examples in other types of configurations or arrangements.

As illustrated in the clustered network environment 100, node computing devices 106(1)-106(n) can include various functional components that coordinate to provide a distributed storage architecture. For example, the node computing devices 106(1)-106(n) can include network modules 114(1)-114(n) and disk modules 116(1)-116(n). Network modules 114(1)-114(n) can be configured to allow the node computing devices 106(1)-106(n) (e.g., network storage controllers) to connect with client devices 108(1)-108(n) over the storage network connections 112(1)-112(n), for example, allowing the client devices 108(1)-108(n) to access data stored in the clustered network environment 100.

Further, the network modules 114(1)-114(n) can provide connections with one or more other components through the cluster fabric 104. For example, the network module 114(1) of node computing device 106(1) can access the data storage device 110(n) by sending a request via the cluster fabric 104 through the disk module 116(n) of node computing device 106(n). The cluster fabric 104 can include one or more local and/or wide area computing networks embodied as Infiniband, Fibre Channel (FC), or Ethernet networks, for example, although other types of networks supporting other protocols can also be used.

Disk modules 116(1)-116(n) can be configured to connect data storage devices 110(1)-110(2), such as disks or arrays of disks, SSDs, flash memory, or some other form of data storage, to the node computing devices 106(1)-106(n). Often, disk modules 116(1)-116(n) communicate with the data storage devices 110(1)-110(n) according to the SAN protocol, such as SCSI or FCP, for example, although other protocols can also be used. Thus, as seen from an operating system on node computing devices 106(1)-106(n), the data storage devices 110(1)-110(n) can appear as locally attached. In this manner, different node computing devices 106(1)-106(n), etc. may access data blocks, files, or objects through the operating system, rather than expressly requesting abstract files.

While the clustered network environment 100 illustrates an equal number of network modules 114(1)-114(n) and disk modules 116(1)-116(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 108(1)-108(n) can be networked with the node computing devices 106(1)-106(n) in the cluster, over the storage connections 112(1)-112(n). As an example, respective client devices 108(1)-108(n) that are networked to a cluster may request services (e.g., exchanging of information in the form of data packets) of node computing devices 106(1)-106(n) in the cluster, and the node computing devices 106(1)-106(n) can return results of the requested services to the client devices 108(1)-108(n). In one example, the client devices 108(1)-108(n) can exchange information with the network modules 114(1)-114(n) residing in the node computing devices 106(1)-106(n) (e.g., network hosts) in the data storage apparatuses 102(1)-102(n).

In one example, the storage apparatuses 102(1)-102(n) host aggregates corresponding to physical local and/or remote data storage devices, such as local flash or disk storage in the data storage devices 110(1)-110(n), for example. One or more of the data storage devices 110(1)-110(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 118(1)-118(n) in this example, although any number of volumes can be included in the aggregates. The volumes 118(1)-118(n) are virtual data stores or storage objects that define an arrangement of storage and one or more filesystems within the clustered network environment 100. Volumes 118(1)-118(n) can span a portion of a disk or other storage device, a collection of disks, or portions of disks, for example, and typically define an overall logical arrangement of data storage. In one example volumes 118(1)-118(n) can include stored user data as one or more files, blocks, or objects that reside in a hierarchical directory structure within the volumes 118(1)-118(n).

Volumes 118(1)-118(n) are typically configured in formats that may be associated with particular storage systems, and respective volume formats typically comprise features that provide functionality to the volumes 118(1)-118(n), such as providing the ability for volumes 118(1)-118(n) to form clusters, among other functionality. Optionally, one or more of the volumes 118(1)-118(n) can be in composite aggregates and can extend between one or more of the data storage devices 110(1)-110(n) and one or more cloud storage device(s) to provide tiered storage, for example, and other arrangements can also be used in other examples.

In one example, to facilitate access to data stored on the disks or other structures of the data storage devices 110(1)-110(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 110(1)-110(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 110(1)-110(n) can have one or more physical ports, wherein each physical port can be assigned a target address (e.g., SCSI target address). To represent respective volumes, a target address on the data storage devices 110(1)-110(n) can be used to identify one or more of the LUNs. Thus, for example, when one of the node computing devices 106(1)-106(n) connects to a volume, a connection between the one of the node computing devices 106(1)-106(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 2:
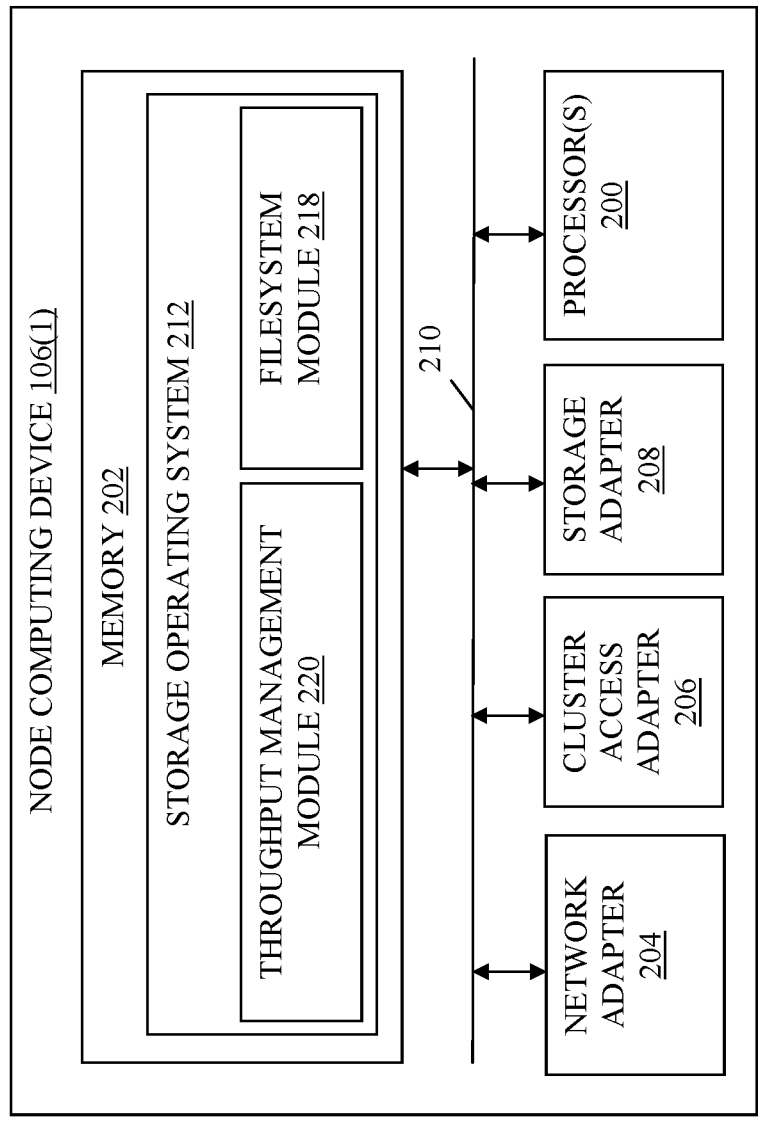
FIG. 2 is a block diagram of an exemplary node computing device.

Referring to FIG. 2, node computing device 106(1) in this particular example includes processor(s) 200, a memory 202, a network adapter 204, a cluster access adapter 206, and a storage adapter 208 interconnected by a system bus 210. The node computing device 106 also includes a storage operating system 212 installed in the memory 206 that can, for example, implement a RAID data loss protection and recovery scheme to optimize reconstruction of data of a failed disk or drive in an array. In some examples, the node computing device 106(n) is substantially the same in structure and/or operation as node computing device 106(1), although the node computing device 106(n) can also include a different structure and/or operation in one or more aspects than the node computing device 106(1).

The network adapter 204 in this example includes the mechanical, electrical and signaling circuitry needed to connect the node computing device 106(1) to one or more of the client devices 108(1)-108(n) over network connections 112(1)-112(n), which may comprise, among other things, a point-to-point connection or a shared medium, such as a local area network. In some examples, the network adapter 204 further communicates (e.g., using TCP/IP) via the cluster fabric 104 and/or another network (e.g. a WAN) with cloud storage device(s) (not shown) to process storage operations associated with data stored thereon.

The storage adapter 208 cooperates with the storage operating system 212 executing on the node computing device 106(1) to access information requested by the client devices 108(1)-108(n) (e.g., to access data on one or more of the data storage devices 110(1)-110(n)). The information may be stored on any type of attached array of writeable media such as magnetic disk drives, flash memory, and/or any other similar media adapted to store information.

In the exemplary data storage devices 110(1)-110(n), information can be stored in data blocks on disks. The storage adapter 208 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)).

The information is retrieved by the storage adapter 208 and, if necessary, processed by the processor(s) 200 (or the storage adapter 208 itself) prior to being forwarded over the system bus 210 to the network adapter 204 (and/or the cluster access adapter 206 if sending to another node computing device in the cluster) where the information is formatted into a data packet and returned to a requesting one of the client devices 108(1)-108(n) and/or sent to another node computing device attached via the cluster fabric 104. In some examples, a storage driver in the memory 202 interfaces with the storage adapter 208 to facilitate interactions with the data storage devices 110(1)-110(n).

The storage operating system 212 can also manage communications for the node computing device 106(1) among other devices that may be in a clustered network, such as attached to a cluster fabric 104. Thus, the node computing device 106(1) can respond to client device requests to manage data on one of the data storage devices 110(1)-110(n) or cloud storage device(s) (e.g., or additional clustered devices) in accordance with the client device requests.

The file system module 218 of the storage operating system 212 can establish and manage one or more filesystems including software code and data structures that implement a persistent hierarchical namespace of files and directories, for example. As an example, when a new data storage device (not shown) is added to a clustered network system, the file system module 218 is informed where, in an existing directory tree, new files associated with the new data storage device are to be stored. This often referred to as "mounting" a filesystem.

In the example node computing device 106(1), memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures.

The storage operating system 212, portions of which are typically resident in the memory 202 and executed by the processor(s) 200, invokes storage operations in support of a file service implemented by the node computing device 106(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

In this particular example, the memory 202 also includes a throughput management module 220. The throughput management module generally manages, schedules, and dynamically throttles requests in the form of workloads that are processed by the storage operating system 212. The workloads are associated with operations required to service storage requests (e.g., read/write requests from the client devices 108(1)-108(n)) and manage the data on the data storage devices (e.g., facilitate snapshots and backup operations), for example, although other types of workloads are also processed by the storage operating system 212.

The workloads can be priority or non-priority workloads in which the priority workloads correspond with a guaranteed minimum throughput SLO. To conform to the guaranteed minimum throughput SLO, the throughput management module 220 dynamically throttles the non-priority workloads that may be interfering and resulting in increased latency and reduced throughput for the priority workloads. Accordingly, the throughput management module 220 can maintain queues or other data structures to manage workloads in which a queue storing non-priority workloads can be throttled in order to rate-limit the non-priority workloads.

In one example, the guaranteed minimum throughput and throttling rate can be based on a number of I/O operations per second (IOPS), although other types of metrics including bytes per second can also be used for the SLO and/or throttling rate. To implement dynamic throttling, the throughput management module 220 monitors performance of the storage operating system in periods of time referred to herein as detection intervals, which can be within other periods of time referred to herein as observation areas and detection windows.

A detection interval is considered violated when an average throughput for workloads processed within the time period associated with the detection interval does not exceed the stated guaranteed minimum throughput of the SLO. Based in part on a number of detection intervals with a violation within a time period corresponding to a detection window, the throughput management module 220 may set an incremental or full throttle with respect to non-priority, interfering workloads.

The throughput management module then utilizes continued performance monitoring via an observation area and subsequent detection intervals and detection windows to dynamically and selectively reduce or increase the throttle to maintain a throttling rate that optimizes throughput for the storage operating system 212 and improves the amount or percentage of time in which the guaranteed minimum throughput SLO is satisfied. The operation of the throughput management module 220 is described and illustrated in more detail later with reference to FIGS. 3-9.

The examples of the technology described and illustrated herein may be embodied as one or more non-transitory computer readable media having machine or processor-executable instructions stored thereon for one or more aspects of the present technology (e.g., memory 202), which when executed by processor(s) (e.g., processor(s) 200), cause the processor(s) to carry out the steps necessary to implement the methods of this technology, as described and illustrated with the examples herein. In some examples, the executable instructions are configured to perform one or more steps of a method, such as one or more of the exemplary methods described and illustrated later with reference to FIGS. 3-9, for example.

Figure 3:
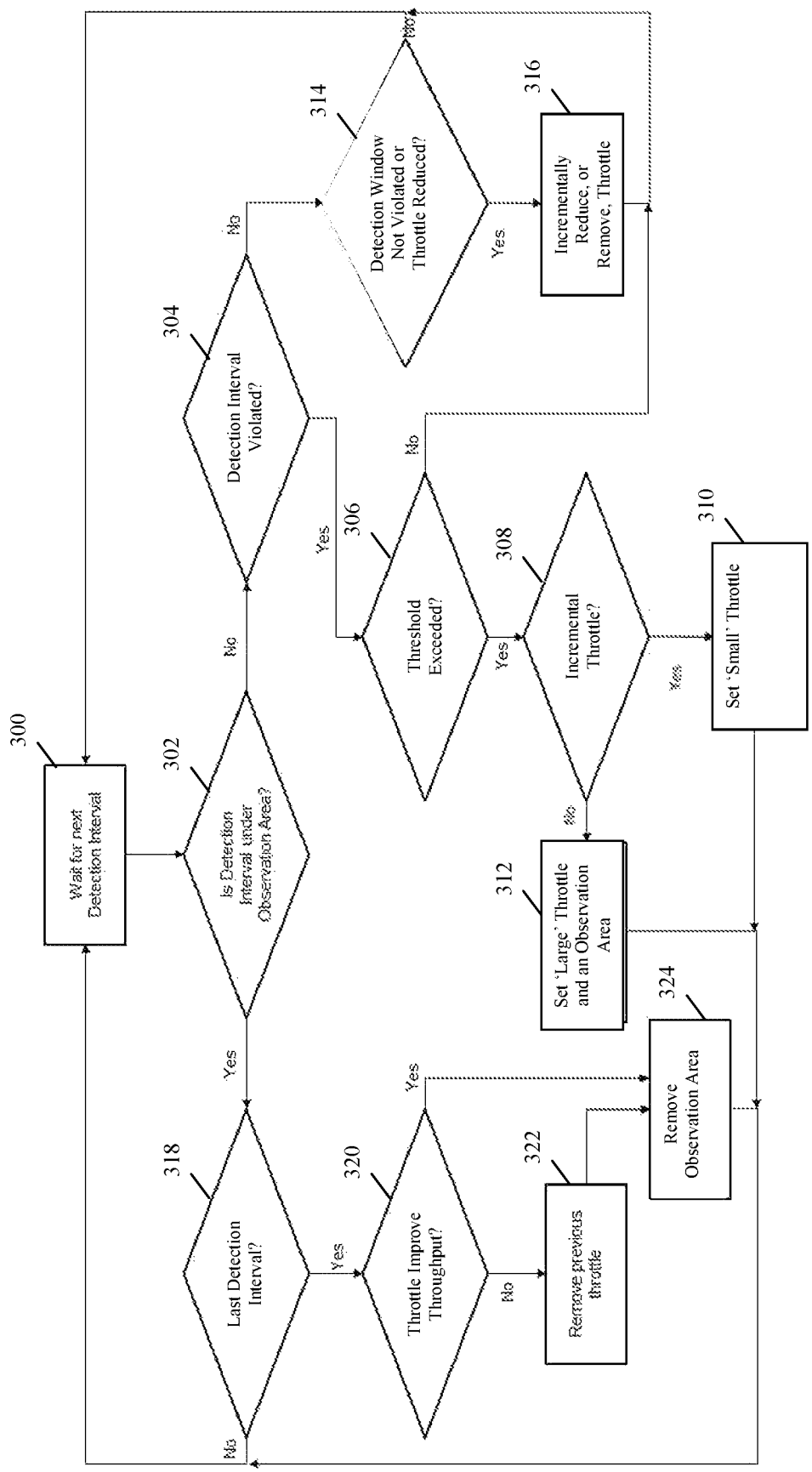
FIG. 3 is a flowchart of an exemplary method for dynamic throttling to satisfy minimum throughput service level objectives (SLOs)

Referring more specifically to FIG. 3, a flowchart illustrating an exemplary method for dynamic throttling to satisfy minimum throughput service level objectives (SLOs) is illustrated. In step 300 in this example, the node computing device 106(1) determines when a detection interval has occurred. The detection interval is a period of time during which workloads are processed by the storage operating system 212. Detection intervals are marked as either violated or non-violated based on whether a guaranteed minimum throughput SLO was violated by the detection interval. The guaranteed minimum throughput SLO is violated when an average throughput for the workloads processing during the detection interval does not exceed the guaranteed minimum throughput SLO value.

The throughput for a particular workload can be determined based on a deadline attached to the workload and a current time at which the workload is processed, although other methods for analyzing throughput for particular workloads can also be used. Accordingly, the storage operating system 212 in this example monitors the workloads during the detection window, generates an average throughput for the detection interval when the time period for the detection interval expires, and marks the detection interval as violated when the generated average throughput does not exceed the guaranteed minimum throughput stated in the SLO. Other methods for determining whether a detection interval is violated can also be used in other examples. Upon detecting that a detection interval has occurred based on expiration of an associated time period, the node computing device 106(1) proceeds to step 302.

In step 302, the node computing device 106(1) determines whether the detection interval is under or within an observation area. The observation area corresponds with a time period during which the impact of throttling is observed and a set throttle is neither increased nor decreased. The observation are can be defined by a time period and/or a number of detection intervals, for example. Using the observation area, the effect of a throttle can be observed and monitored to improve the quality of a subsequent decision to increase or decrease the throttle, and thereby reduce oscillations associated with alternating period of too high of a throttle rate followed by too low of a throttle rate. If the node computing device 106(1) determines that a current detection interval is outside a current observation window, then the No branch is taken to step 304.

In step 304, the node computing device 106(1) determines whether the detection interval is marked as violated, such as by the operating system 212, for example. As explained earlier, the detection interval can be violated when an average throughput of associated priority workloads does not exceed a guaranteed minimum throughput value of an SLO, although other methods for determining whether a detection interval is violated and/or marking or identifying a detection interval as violated, can also be used in other examples. If the node computing device 106(1) determines that the detection interval is marked as violated, then the Yes branch is taken to step 306.

In step 306, the node computing device 106(1) determines whether a violation threshold is exceeded based on a number of detection intervals that were marked as violated within a current detection window. The detection window is defined in this example as a time period corresponding to a number of detection intervals, and is generally longer than an observation area, although other types of detection windows can also be used. The throughput management module in this example maintains a count of the number of observed detection intervals marked as violated within a current detection window, and clears the count upon expiration of each detection window.

In one example described and illustrated in more detail later with reference to FIGS. 4-9, a detection window can be 10 detection intervals, a violation threshold can be 20% of the detection window or two detection intervals, and an observation area can be 50% of the detection window or five detection intervals, although other sizes of detection windows, violation thresholds, and observations areas can also be used in other examples. If the node computing device 106(1) determines that the violation threshold has not been exceeded, then the No branch is taken back to step 300, and the node computing device 106(1) again waits for another detection interval. However, if the node computing device 106(1) determines that the violation threshold has been exceeded, then the Yes branch is taken to step 308.

In step 308, the node computing device 106(1) determines whether to implement an incremental throttle. In this example, the node computing device 106(1) is configured to implement either a relatively small, incremental throttle, or a relatively large throttle, although the throttle rate can be dynamically-determined and different throttle rates can be used in other examples. In one example, the throttle limits the rate at which non-priority, interfering workloads are retrieved from queue(s) and processed, although other methods for limiting the rate at which non-priority workloads are handled can also be used in other examples.

The determination as to whether to implement a smaller or larger throttle can be based on any number of factors including whether a throttle is currently implemented or whether a currently-implemented throttle was previously reduced, for example. In one example, an initial throttle can be relatively large in implementations in which workloads tend to be initiated in bursts so that the throttle is more likely to allow the storage operating system 212 to satisfy the guaranteed minimum throughput of the SLO. If the throttle improves throughput, then the node computing device 106 (1) can relatively slowly reduce the throttle, as described and illustrated in more detail later.

In another example, if a throttle was previously reduced (e.g., by an incremental or relatively small amount), but the condition in step 306 was satisfied, then the throttle rate is likely to be close to optimal and the node computing device 106(1) may therefore determine in step 308 that an incremental throttle should be implemented. Other basis for determining whether a throttle should be set or increased by a larger or smaller rate can also be used in other examples. If the node computing device 106(1) determines in step 308 that an incremental throttle should be implemented, then the Yes branch is taken to step 310.

In step 310, the node computing device 106(1) implements a relatively small, incremental throttle. In the examples described and illustrated in more detail later with reference to FIGS. 4-9, an incremental throttle is 200 IOPS, although any other value for the incremental throttle rate can also be used. Generally, the incremental throttle is used by the node computing device 106(1) to focus in on a current optimal throttle rate, and is therefore accretive to a throttle that is currently implemented. Subsequent to implementing the incremental, relatively small throttle, the node computing device 106(1) proceeds back to step 300 and waits for another detection interval. However, if the node computing device 106(1) determines in step 308 that an incremental throttle should not be implemented, then the No branch is taken to step 312.

In step 312, the node computing device 106(1) implements a relatively large or full throttle and establishes an observation area. In the examples described and illustrated in more detail later with reference to FIGS. 4-9, an incremental throttle is 1000 IOPS, although any other value for the full throttle rate can also be used. Generally, the full throttle is used to improve throughput in a burst condition or when a previous relatively large throttle improved throughput by an insufficient amount, for example.

To establish the observation area, the node computing device 106(1) can set a flag or otherwise store an indication (e.g., a number of associated detection intervals) that an observation area is to begin. The observation area allows for a smoothing of throttle adjustments to mitigate relatively extreme and/or frequent oscillations in throttle rate that results in suboptimal throughput, as explained in more detail earlier. Subsequent to implementing the relatively large throttle, the node computing device 106(1) proceeds back to step 300 and waits for another detection interval.

Referring back to step 304, if the node computing device 106(1) determines that a detection interval is not marked as violated, then the No branch is taken to step 314. Accordingly, in this iteration, a current detection interval was determined not to be within, i.e. outside, an observation area in step 302. The observation area could have been established in step 312, for example, as described and illustrated in more detail earlier. To determine whether the detection interval is within the observation area, the throughput management module 220 can count observed detection intervals against the stored indication of total number of detection intervals corresponding to the observation area, for example, although other methods for determining whether a detection interval is within an observation area can also be used.

In step 314, the node computing device 106(1) determines whether each of the detection intervals in an entire detection window that includes the current detection interval, which is outside the observation area and is not marked as violated, is also not marked as violated. Alternatively, the node computing device 106(1) determines in step 314 whether the throttle was reduced in a previous detection interval (e.g., an immediately prior detection interval or another detection interval within the same detection window as the current detection interval).

A detection window comprising only non-violated detection intervals, and a recent previous throttle reduction, are indications that the throttle may be able to be reduced without negatively impacting satisfaction of the guaranteed minimum throughput SLO. Accordingly, if each of the detection intervals in the current detection window is marked as non-violated or the throttle was recently reduced, then the Yes branch is taken to step 316.

In step 316, the node computing device 106(1) incremental reduces the current throttle rate, or removes the current throttle. The incremental reduction can be by an amount corresponding to the incremental increase utilized in step 310, although other amounts can also be used. The throttle can be removed when another incremental reduction would result in no throttling for the non-priority workloads. In another example, the throttle can be removed following a particular number of consecutive rate reductions, and other basis for reducing the throttle rate or removing the throttle can also be used in other examples.

Subsequent to reducing the throttle rate or removing the throttle, or if the node computing device 106(1) determines in step 314 that any of the detection intervals in the current detection window is marked as violated and the throttle was not recently reduced and the No branch is taken, then the node computing device 106(1) proceeds back to step 300 and waits for another detection interval. Referring back to step 302, if the node computing device 106(1) determines in another interval that the current detection interval is within an observation area (e.g., as established in step 312), then the Yes branch is taken to step 318.

In step 318, the node computing device 106(1) determines whether the current detection interval is the last detection interval within the observation area. As explained earlier, the throughput management module 220 can maintain a count of detection intervals associated with an established observation area, which can be used in step 308 to determine whether the current detection interval is the last detection interval within the observation area.

If the node computing device determines that the current detection interval is not the last detection interval within the observation area, then the No branch is taken back step 300 and the node computing device 106(1) again waits for the next detection interval. Accordingly, no reduction or increases in throttle rate occur in this example while an observation area is establishing. However, if the node computing device 106(1) determines that the current detection interval is the last detection interval within the observation area, then the Yes branch is taken to step 320.

In step 320, the node computing device 106(1) determines whether the throttle that was set prior to the observation area being established (e.g., in step 312) improved throughput. In one example, the level of required improvement can be based on a threshold and, in another example, any level of improvement can satisfy the condition in step 320. The throughput management module 220 in this example monitors and maintains the average throughput for detection intervals within the observation area in order to facilitate the analysis in step 320. Other methods for determining whether the improvement is significant enough to satisfy the condition, and/or other methods for determining the improvement in throughput, can also be used in other examples. If the node computing device 106(1) determines that the current throttle did not improve throughput, then the No branch is taken to step 322.

In step 322, the node computing device 106(1) removes the previous throttle. An observation area is only established in this example upon implementing a relatively large throttle. If the relatively large throttle did not improve throughput during the observation area, then the throttling is unnecessary and should be discontinued. Therefore, the node computing device 106(1) removes the throttle in step 322. However, if the node computing device 106(1) determines in step 320 that the throttle improved throughput, then the Yes branch is taken to step 324.

In step 324, the node computing device 106(1) removes the observation area or otherwise allows the observation area to expire. Subsequent to removing the observation area, the node computing device 106(1) proceeds back to step 300 and waits for another detection interval. In some subsequent iterations, the throttle may have improved throughput but may not have been sufficient to facilitate satisfaction of the guaranteed minimum throughput specified in the SLO. In these iterations, the node computing device 106(1) may proceed through steps 302, 304, 306, 308, and either 310 or 312 in which the throttle rate is increased.

Alternatively, in other subsequent iterations, the throttle may have resulted in satisfaction of the guaranteed minimum throughput specified in the SLO, in which case the node computing device 106(1) may proceed from steps 302, 304, 314, and 315 in which the throttle rate is reduced. Accordingly, the node computing device 106(1) effectively sets a relatively large throttle, waits for an observation area, and then proceeds based on monitoring and feedback to reduce, and potentially increase, the throttling rate by incremental amounts to establish a current throttle that is optimal for facilitating satisfaction of the guaranteed minimum throughput specified in the SLO.

Exemplary operations of the node computing device 106(1) according to the method described and illustrated with reference to FIG. 3 will now be described with reference to FIGS. 4-9. In these examples, the detection window is a sliding window starting at time T0 and comprising ten detection intervals. Additionally, the violation threshold is 2 detection intervals and the observation area is 5 detection intervals.

Figure 4:
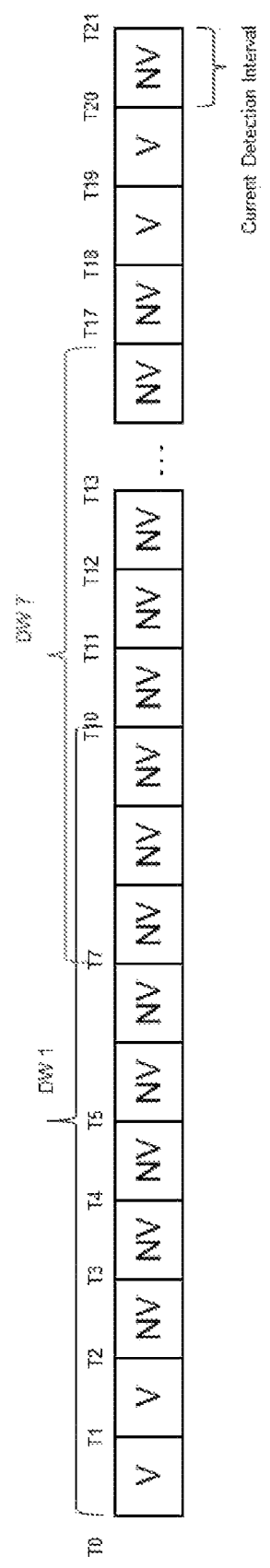
FIG. 4 illustrates an exemplary operation of the method of FIG. 3 in which a throttle is set, maintained, and reduced.
Figure 4:
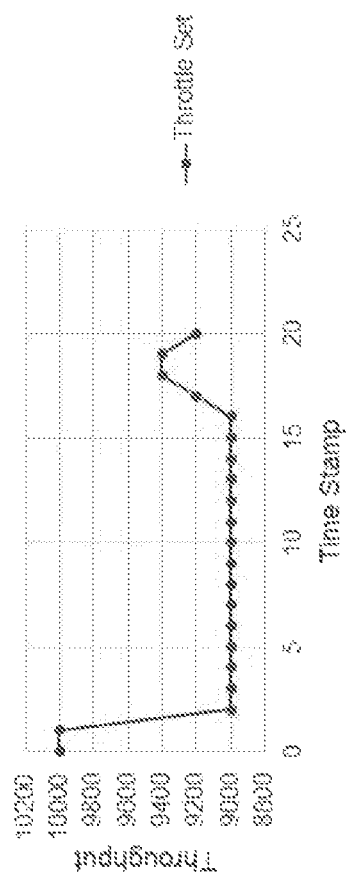

Referring more specifically to FIG. 4, an exemplary operation of the method of FIG. 3 in which a throttle is set, maintained, and reduced is illustrated. At time T2 in this example, the node computing device 106(1) observed two detection intervals marked as violated within a detection window and outside of an observation area, resulting in the violation threshold being exceeded and a relatively large 1 k IOPS increase in the 10 k IOPS throttle rate. After a five detection interval observation area, the detection window includes 10 detection intervals that were not marked as violated indicating that the throttle improved throughput. Accordingly, the throttle rate is decreased by the node computing device 106(1) by a relatively small 200 IOPS at time T17.

The next detection interval after time T17 is also not marked as violated and, accordingly, the node computing device 106(1) decreases the throttle rate again by a relatively small 200 IOPS at time T18. However, the next two detection intervals are marked as violated, thereby exceeding the violation threshold. Since the prior action was a relatively small reduction in the throttle rate, the node computing device 106(1) implements a relatively small increase of 200 IOPS in the throttle rate at time T20.

Figure 5:
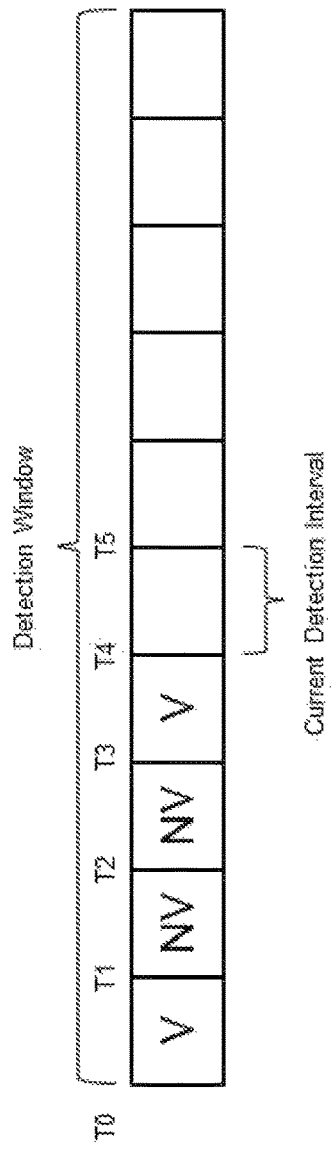
FIG. 5 illustrates an exemplary operation of the method of FIG. 3 in which a throttle is set and not reduced.
Figure 5:
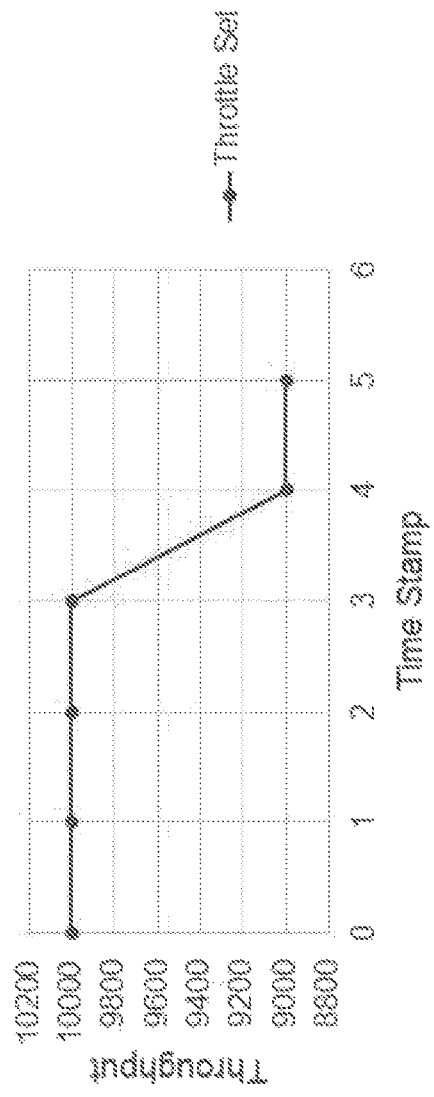

Referring more specifically to FIG. 5, an exemplary operation of the method of FIG. 3 in which a throttle is set and not reduced is illustrated. In this example, the fifth detection interval is the current detection interval, and the first and fourth detection intervals with the detection window were marked as violated. Therefore, the node computing device 106(1) implements a relatively large increase of 1 k IOPS in the throttle rate and establishes an observation area.

Figure 6:
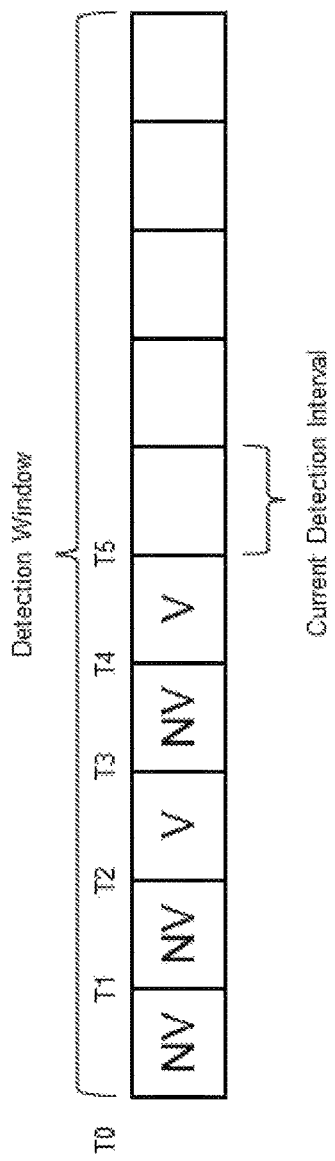
FIG. 6 illustrates an exemplary operation of the method of FIG. 3 in which an incremental throttle is set and not reduced.
Figure 6:
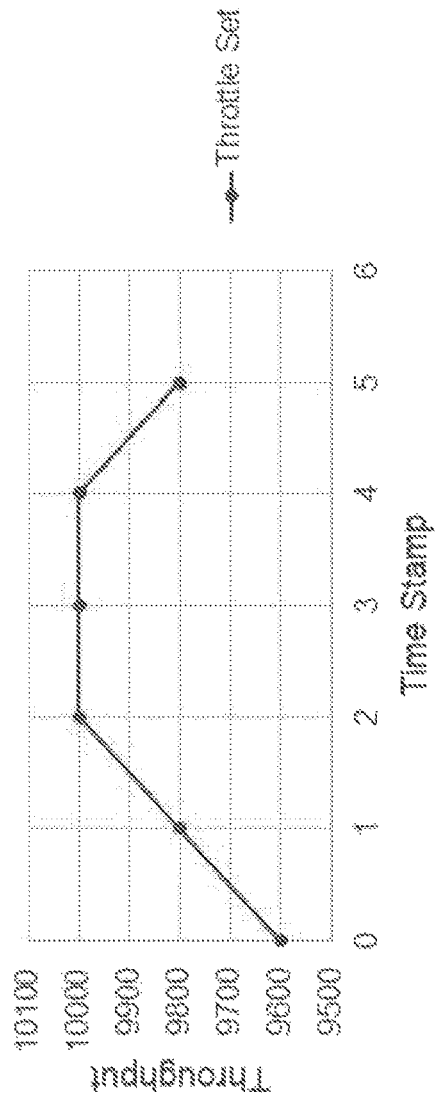

Referring more specifically to FIG. 6, an exemplary operation of the method of FIG. 3 in which an incremental throttle is set and not reduced is illustrated. In this example, the third and fifth detection intervals within the detection window were marked as violated, thereby exceeding the violation threshold. Since the throttle rate was previously reduced by a relatively small 200 IOPS by the node computing device 106(1) at time T2, the node computing device 106(1) increases the throttle rate by a relatively small 200 IOPS upon determining that the violation threshold was exceeding at time T5.

Figure 7:
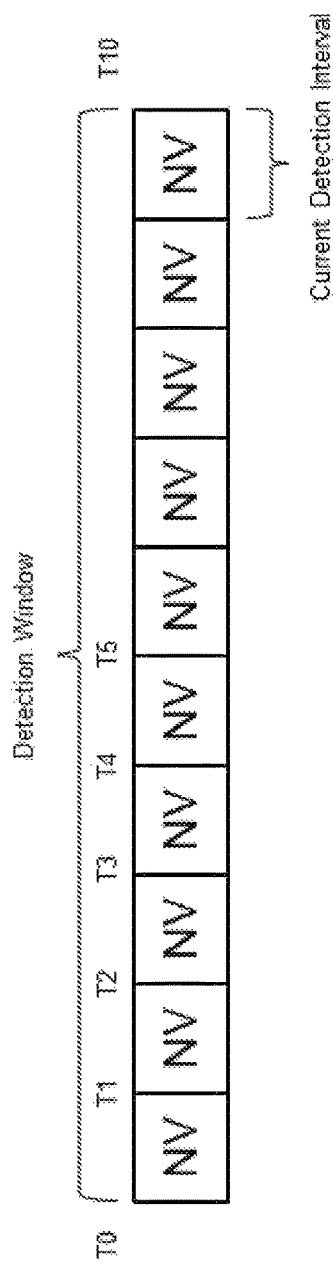
FIG. 7 illustrates an exemplary operation of the method of FIG. 3 in which a throttle is reduced.
Figure 7:
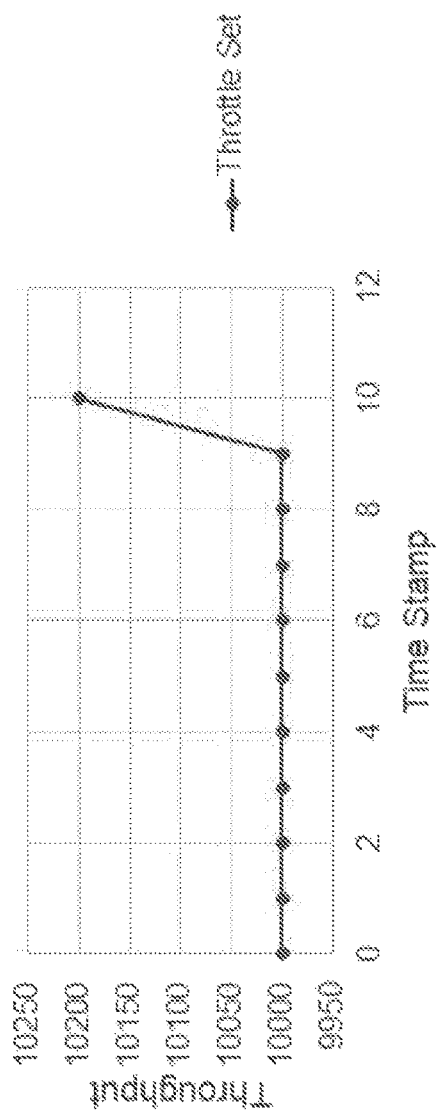

Referring more specifically to FIG. 7, an exemplary operation of the method of FIG. 3 in which a throttle is reduced is illustrated. In this example, the throttle was set at time T0 and the subsequent 10 detection windows are not marked as violated. Accordingly, at time T10, the node computing device 106(1) reduces the throttle rate by a relatively small 200 IOPS.

Figure 8:
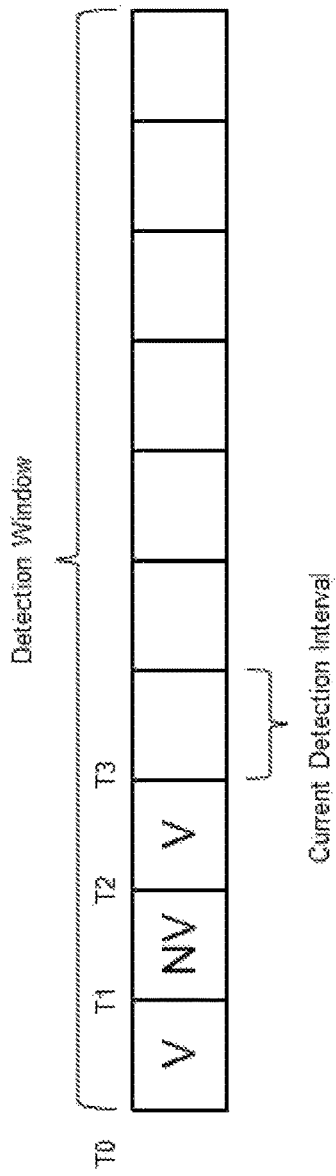
FIG. 8 illustrates an exemplary operation of the method of FIG. 3 in which a throttle is maintained.
Figure 8:
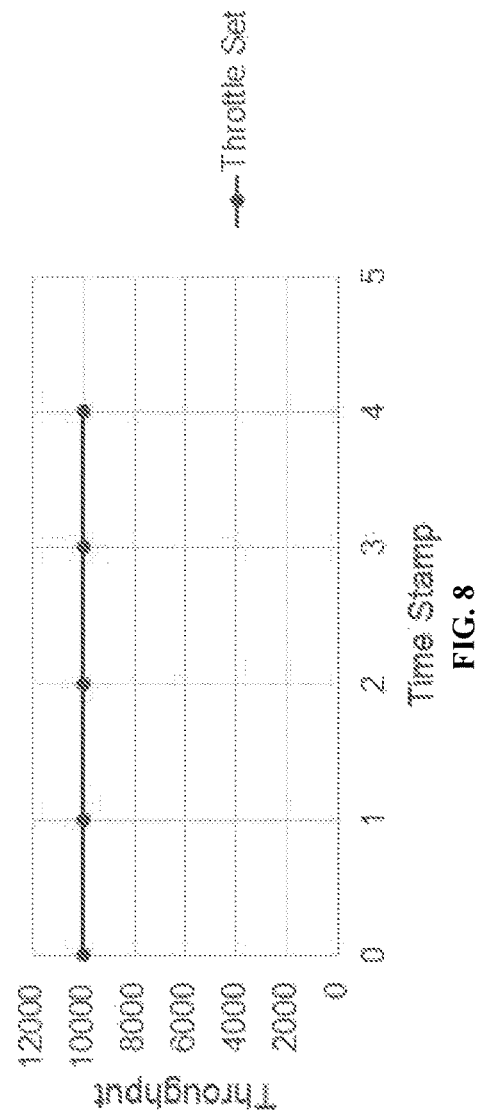

Referring more specifically to FIG. 8, an exemplary operation of the method of FIG. 3 in which a throttle is maintained is illustrated. In this example, the throttle was previously set and the current detection interval at time T3 is the last detection interval within the observation area. Since the detection interval at time T1 was not marked as violated, the current throttle did improve throughput and node computing device 106(1) maintains the current throttle. Other metrics for determining that the throughput was improved can also be used in other examples. However, since the detection intervals at times T0 and T2 are marked as violated, thereby exceeding the violation threshold, the node computing device 106(1) will subsequently determine that an increase in the throttle rate is warranted.

Figure 9:
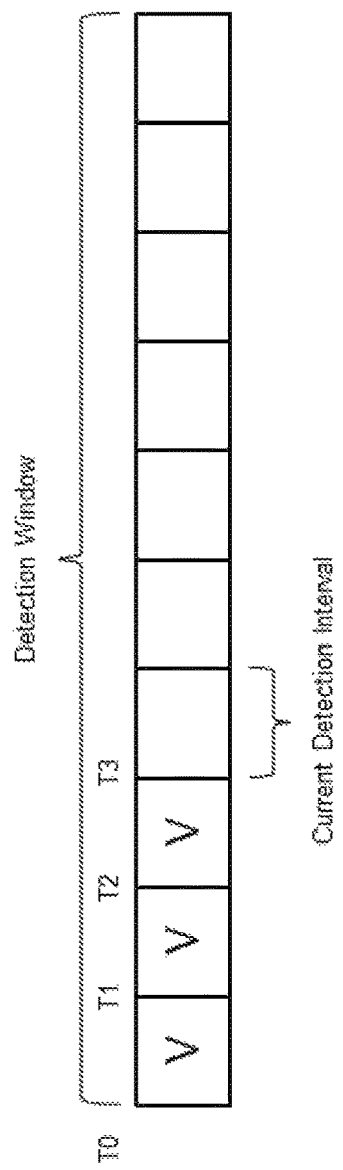
FIG. 9 illustrates an exemplary operation of the method of FIG. 3 in which a throttle is removed.
Figure 9:
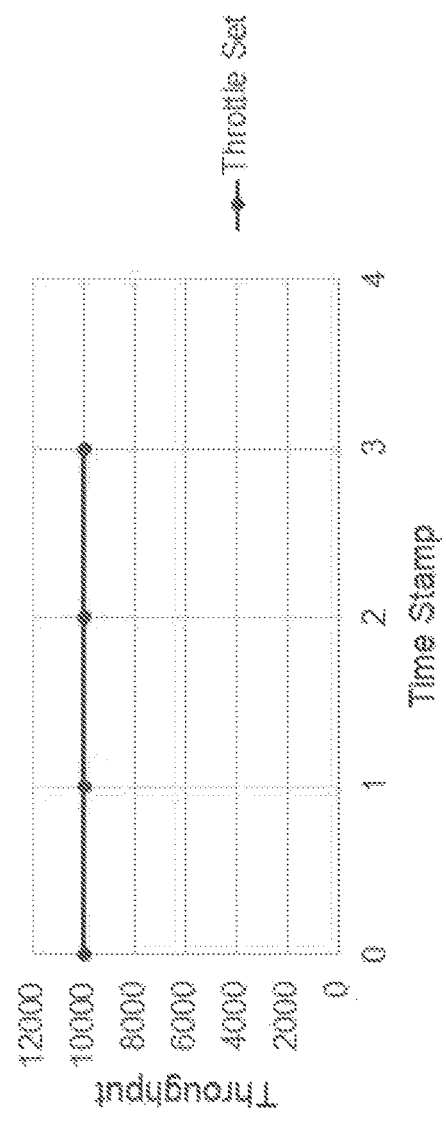

Referring more specifically to FIG. 9, an exemplary operation of the method of FIG. 3 in which a throttle is removed is illustrated. In this example, the throttle was previously set based on an increase of the throttle rate by a relatively large amount. Within the subsequent observation area, all of the detection intervals, including those from times T0-T2, were marked as violated. Since the throttle did not improve throughput, the node computing device 106(1) removes the throttle to avoid unnecessary throttling. Other metrics for determining that the throughput was not improved can also be used in other examples.

Accordingly, with this technology, workloads are more effectively managed by storage devices to improve performance and satisfy guaranteed minimum throughput SLOs. In particular, oscillation in throttling rates for non-priority workloads is reduced with this technology, along with unnecessary throttling that does not improve throughput for priority workloads. Additionally, throttling rates for non-priority workloads are optimally set and managed to maximize overall throughput while meeting guaranteed minimum throughput SLOs for priority workloads.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method executed by one or more processors and comprising:
   executing one or more non-priority workloads according to a full throttle when a throttle rate of a first average throughput of first priority workloads is lower than a guaranteed minimum throughput for at least a threshold number of a plurality of detection intervals within a detection window time period, wherein the first average throughput is based on a first throughput for the first priority workloads executed during each of the plurality of detection intervals, the full throttle rate remains unchanged during an observation area time period, and the first priority workloads are associated with a storage network.

2. The method of claim 1, further comprising removing the full throttle when a second average throughput for second priority workloads executed during the observation area time period indicates a failure to improve upon the first average throughput by at least a threshold throughput.

3. The method of claim 2, wherein a current detection interval is a last detection interval within the observation area time period prior to removing the full throttle.

4. The method of claim 1, wherein the detection window time period is longer than the observation area time period.

5. The method of claim 1, wherein the non-priority workloads are executed in accordance with the throttle rate.

6. The method of claim 1, wherein the observation area time period ends when a second average throughput for second priority workloads executed during the observation area time period improves upon the first average throughput by at least a threshold throughput.

7. A non-transitory machine-readable medium having stored thereon instructions comprising machine executable code which when executed by at least one machine causes the machine to:
   execute one or more first priority workloads according to a reduced throttle rate when a first throughput for second priority workloads executed during a first detection interval indicates an improvement upon a second throughput for the first priority workloads by at least a threshold throughput, wherein the reduced throttle rate is based on an average of the second throughput being lower than a guaranteed minimum throughput for at least a threshold number of a plurality of detection intervals within a detection window time period, the second priority workloads are associated with a storage network, and the second priority workloads are executed during each of the plurality of detection intervals.

8. The non-transitory machine-readable medium of claim 7, wherein the reduced throttle rate is removed when a third throughput for third priority workloads executed during an observation area time period indicates a failure to improve upon the second throughput by at least another threshold throughput.

9. The non-transitory machine-readable medium of claim 8, wherein a current detection interval is a last detection interval within the observation area time period prior to the removal of the reduced throttle rate, wherein the detection window time period is longer than the observation area time period.

10. The non-transitory machine-readable medium of claim 8, wherein the observation area time period ends when the third throughput indicates the failure to improve upon the second throughput by the at least another threshold throughput.

11. The non-transitory machine-readable medium of claim 7, wherein the machine executable code when executed by the machine further causes the machine to execute one or more non-priority workloads according to a full throttle rate, wherein the full throttle rate remains unchanged during a set observation area time period.

12. The non-transitory machine-readable medium of claim 7, wherein wherein non-priority workloads are executed in accordance with the reduced throttle rate.

13. The non-transitory machine-readable medium of claim 7, wherein the reduced throttle rate comprises an incremental throttle and the machine executable code when executed by the machine further causes the machine to execute one or more non-priority workloads according to the reduced throttle rate without setting an observation area time period.

14. A computing device, comprising:
   a memory containing machine readable medium comprising machine executable code having stored thereon instructions; and a processor coupled to the memory and configured to execute the machine executable code to cause the processor to:
throttle execution of non-priority workloads according to a rate that remains unchanged during an observation area; and
end the throttling and the observation area when a first throughput for first priority workloads executed during the observation area indicates a failure to improve upon a second throughput for second priority workloads by a threshold throughput, wherein an average of the second throughput is lower than a stored guaranteed minimum throughput for a threshold number of detection intervals within a detection window, the second priority workloads are executed during the detection window, and the second priority workloads are associated with a storage network.

15. The computing device of claim 14, wherein the machine executable code to further cause the processor to end the throttling based on other detection intervals within another detection window that is outside of the observation area.

16. The computing device of claim 14, wherein the observation area corresponds to a first time period and the detection window corresponds to a second time period different than the first time period.

17. The computing device of claim 14, wherein the machine executable code to further cause the processor to end the throttling when a threshold number of consecutive throttle rate reductions has been exceeded.

18. The computing device of claim 14, wherein the machine executable code to further cause the processor to end the throttling when a third throughput for third priority workloads executed during the observation area indicates a failure to improve upon the second throughput by at least another threshold throughput.

19. The computing device of claim 14, wherein a current detection interval is a last detection interval within the observation area prior to ending the throttling, wherein the detection window is longer than the observation area.

20. The computing device of claim 14, wherein the observation area ends when a third throughput for third priority workloads executed during the observation area improves upon the second throughput by at least another threshold throughput.

* * * * *